Dec. 2, 1924.
C. C. BONTA
1,517,274
DEMOUNTABLE TIRE RIM
Filed May 31, 1924
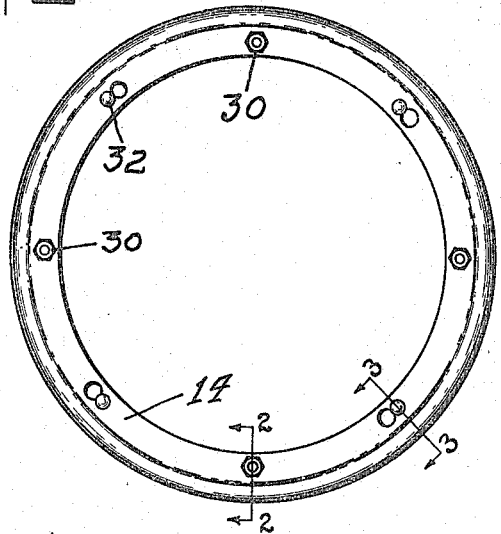
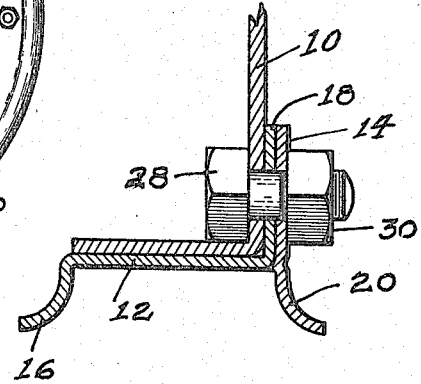
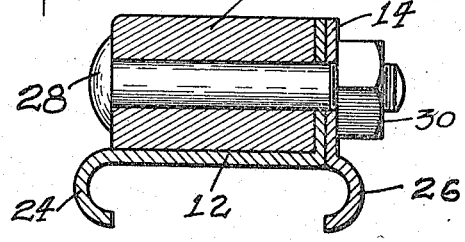
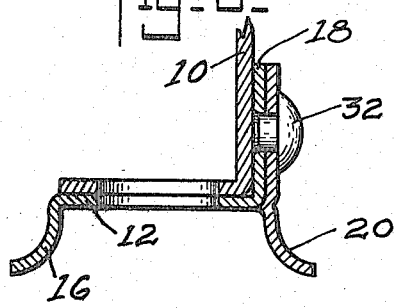
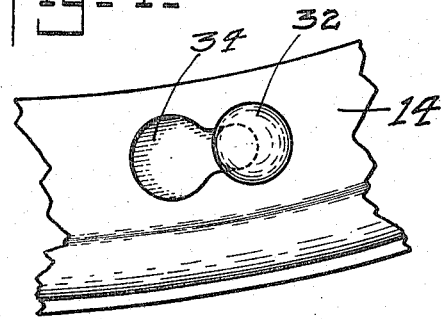
INVENTOR.
Charles C. Bonta
BY Albert J. Fihe
ATTORNEY.

Patented Dec. 2, 1924.

1,517,274

UNITED STATES PATENT OFFICE.

CHARLES C. BONTA, OF LOUISVILLE, KENTUCKY.

DEMOUNTABLE TIRE RIM.

Application filed May 31, 1924. Serial No. 716,876.

*To all whom it may concern:*

Be it known that I, CHARLES C. BONTA, a citizen of the United States, residing at Louisville, in the county of Jefferson and State of Kentucky, have invented certain new and useful Improvements in Demountable Tire Rims; and I do hereby declare the following to be a full, clear, and exact description of the invention, such as will enable others skilled in the art to which it appertains to make and use the same.

This invention relates to improvements in tire rims, especially for automobiles, and has for one of its particular objects the provision of a demountable and detachable rim whereby an automobile tire or the like will be positively maintained in desired relation to the wheel and in such a manner that it can be readily and conveniently removed therefrom for replacement, repairs, or the like.

One of the important objects of this invention is the provision of a demountable and detachable tire rim, particularly for automobiles, which is so constructed that it shall be capable of ready assembly and of the ready application of a tire thereto without the necessity of breaking down or distorting the rim in any way, but which, when assembled, shall positively maintain the tire in operative relation with the wheel.

Another important object of this invention is the provision of a tire rim for automobiles or the like which will be of sturdy construction, composed of a minimum of parts and of very ready applicability to the wheel of almost any automobile now on the market.

Other and further important objects of the invention will be apparent from the disclosures in the accompanying drawings and following specification.

The invention, in a preferred form, is illustrated in the drawings and hereinafter more fully described.

In the drawings:

Figure 1 is a vertical outside elevation of the improved tire rim of this invention.

Figure 2 is a sectional view, taken on the line 2—2 of Figure 1, looking in the direction indicated by the arrows.

Figure 3 is a sectional view, taken on the line 3—3 of Figure 1, illustrating particularly the alignment retaining rivets and the valve stem slot.

Figure 4 is a detail vertical elevation of an alignment retaining rivet and its slot.

Figure 5 is a sectional view through a clamping bolt illustrating the application of clincher rims to wooden wheels in accordance with the improved construction of this invention.

As shown in the drawings:

The reference numeral 10 indicates generally an automobile wheel of the disc type having applied thereto the improved detachable and demountable rim of this invention, comprising essentially an inner member 12 and an outer member 14.

The inner member 12, as best illustrated in Figures 2 and 3, comprises an annular rim member including a flat portion adapted to co-operate with the corresponding flat annular surface of the wheel 10 and further including an extension 16 formed to correspond with the ordinary straight-sided tire now in common use. The outer portion of the rim member 12 is provided with an inturned annular flange as illustrated at 18 in Figures 2 and 3, which contacts with the outer face of the wheel member 10 and has adapted to be applied thereto the corresponding portion 14 of the rim structure.

The outer edge of the member 14 is similarly provided with an extension 20 adapted to grip the straight side of the ordinary automobile tire and corresponds to the member 16 of the rim element 12.

As illustrated in Figure 5, a modification of the invention as applied to a wooden wheel 22 includes the members 12 and 14 which have formed as portions thereof the clincher tire gripping elements 24 and 26, respectively. Bolts and nuts 28—30 are provided, adapted to be fitted into corresponding openings in the rim member and the wheels whereby the rim is securely attached to the wheel in an obvious manner.

As best illustrated in Figures 3 and 4, the inturned flange 18 of the rim member 12 has securely attached thereto a plurality of rivets 32, the heads of these rivets being spaced slightly away from the face of the flange 18 and adapted to co-operate with suitable openings 34 in corresponding portions of the rim element 14. As shown in Figure 4, these slots 34 are formed with enlarged openings adapted for the reception of the rivet heads 32 and it will be further noted from an inspection of Figure 4 that the rivet heads are off-set from the stems so that the stem of the rivet and the edge of the head are flush at one point. This design allows the large portion of the slot to register automatically with the head of the rivet when the two members of the rim are taken apart.

It will be obvious that herein is provided a simple, yet efficient and economical form of automobile tire rim, which, besides being easily operated, can be readily manufactured and at much less cost than the ordinary rim now on the market.

I am aware that many changes may be made and numerous details of construction varied throughout a wide range without departing from the principles of this invention, and I therefore do not purpose limiting the patent granted hereon otherwise than as necessitated by the prior art.

I claim as my invention:

An automobile tire rim, including in combination an inner element comprising an annular flattened portion, a circular tire sustaining element, an in-turned flange, and an outer element adapted to co-operate with said in-turned flange, together with spaced locking means on the inner element and corresponding slots in the outer element adapted to co-operate with said spaced locking means, said spaced locking means comprising rivets fastened to the inner element and provided with offset heads whereby the stem of the rivet and the head are flush at one point.

In testimony whereof I affix my signature.

CHARLES C. BONTA.